(12) United States Patent
Shelby et al.

(10) Patent No.: US 12,121,173 B2
(45) Date of Patent: Oct. 22, 2024

(54) SANITIZING FOOD DELIVERY RECEIVER APPARATUS

(71) Applicants: Mark Shelby, Mansfield, TX (US); Hope Saunders, Mansfield, TX (US)

(72) Inventors: Mark Shelby, Mansfield, TX (US); Hope Saunders, Mansfield, TX (US)

( * ) Notice: Subject to any disclaimer, the term of this patent is extended or adjusted under 35 U.S.C. 154(b) by 866 days.

(21) Appl. No.: 17/219,061

(22) Filed: Mar. 31, 2021

(65) Prior Publication Data

US 2022/0313000 A1 Oct. 6, 2022

(51) Int. Cl.
*A47G 29/30* (2006.01)
*A23L 3/28* (2006.01)

(52) U.S. Cl.
CPC ............... *A47G 29/30* (2013.01); *A23L 3/28* (2013.01)

(58) Field of Classification Search
CPC ............ A47G 29/30; A47G 29/14; A23L 3/28
See application file for complete search history.

(56) References Cited

U.S. PATENT DOCUMENTS

| | | | |
|---|---|---|---|
| 5,624,071 A | 4/1997 | Sosan | |
| 6,655,577 B2 | 12/2003 | Mihaylov | |
| D644,814 S | 9/2011 | Clarke | |
| 10,026,054 B1* | 7/2018 | Staton | B65D 25/00 |
| 2003/0085266 A1 | 5/2003 | Simon | |
| 2003/0209462 A1* | 11/2003 | Godshaw | A45C 7/0054 |
| | | | 190/102 |
| 2004/0007434 A1* | 1/2004 | Godshaw | A45C 13/04 |
| | | | 190/110 |
| 2017/0127868 A1 | 5/2017 | Adewuyi | |
| 2017/0188737 A1* | 7/2017 | Hippert | A47G 29/20 |
| 2018/0296016 A1 | 10/2018 | Teoh | |

FOREIGN PATENT DOCUMENTS

| | | | | |
|---|---|---|---|---|
| JP | 2021526433 A | * | 10/2021 | ............ A47G 29/12 |
| WO | WO2014154344 | | 10/2014 | |

OTHER PUBLICATIONS

English translation of JP2021526433 (Year: 2021).*

* cited by examiner

*Primary Examiner* — Regina M Yoo (57) ABSTRACT

A sanitizing food delivery receiver apparatus for safely receiving food deliveries includes a panel having a panel inner face, a panel top edge, a panel bottom edge, a panel left edge, and a panel right edge. A door hook is coupled to the panel to selectively engage a door. A base is coupled to the panel and hingingly moves between an open position oriented perpendicularly to the panel and a closed position oriented parallel to the panel. A front cover is coupled to the panel and hingingly moves between an engaged position and a hang position. A pair of side covers is coupled to the front cover and the panel and is flexible to allow movement of the front cover between the open position and the hang position.

12 Claims, 8 Drawing Sheets

SANITIZING FOOD DELIVERY RECEIVER APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to delivery receiver devices and more particularly pertains to a new delivery receiver device for safely receiving food deliveries. The present invention includes a pair of hooks to attach to a door as well as a fold down base. There is also an ultraviolet (UV) sanitizing light.

(2) Description of Related Art Including Information Disclosed Under 37 CFR 1.97 and 1.98

The prior art relates to delivery receiver devices. Known devices are typically intended for packages rather than food delivery and thus are built for theft prevention rather than sanitization. These devices do not fold up against a door to which they are hanging.

BRIEF SUMMARY OF THE INVENTION

An embodiment of the disclosure meets the needs presented above by generally comprising a panel having a panel inner face, a panel top edge, a panel bottom edge, a panel left edge, and a panel right edge. A door hook is coupled to the panel. The door hook extends above the panel top edge and being configured to selectively engage a door. A base is coupled to the panel. The base has a base top face, a base back edge, a base front edge, a base left edge, and a base right edge. The base back edge is coupled to the panel bottom edge and hingingly moves between an open position oriented perpendicularly to the panel and a closed position oriented parallel to the panel. A front cover is coupled to the panel. The front cover has a cover back edge, a cover front edge, a cover left edge, and a cover right edge. The cover back edge is coupled to the panel top edge and hingingly moves between an engaged position with the cover front edge selectively engaging the base front edge with the base in the open position and a hang position hanging over the base in the closed position. A pair of side covers is coupled to the front cover and the panel. The pair of side covers extends between the cover left edge and the panel left edge and between the cover right edge and the panel right edge. The pair of side covers is flexible to allow movement of the front cover between the open position and the hang position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 8 thereof, a new delivery receiver device embodying the principles and concepts of an embodiment of the disclosure and generally designated by the reference numeral 10 will be described.

As best illustrated in FIGS. 1 through 8, the sanitizing food delivery receiver apparatus 10 generally comprises a panel 12 having a panel inner face 14, a panel top edge 16, a panel bottom edge 18, a panel left edge 20, and a panel right edge 22. The panel top edge 16 may extend perpendicularly from the panel inner face 14.

A door hook 24 is coupled to the panel 12 and extends above the panel top edge 16. The door hook 24 may include a pair of hook sleeves 26 and a pair of hooked arms 28 retractably coupled within the pair of hook sleeves 26. The pair of hooked arms 28 is configured to selectively engage a door 30. A sleeve support 32 may extend between the pair of hook sleeves 26 for structural support. The pair of hooked arms 28 may be squared to prevent blocking the door 30 from closing.

Figure 5:
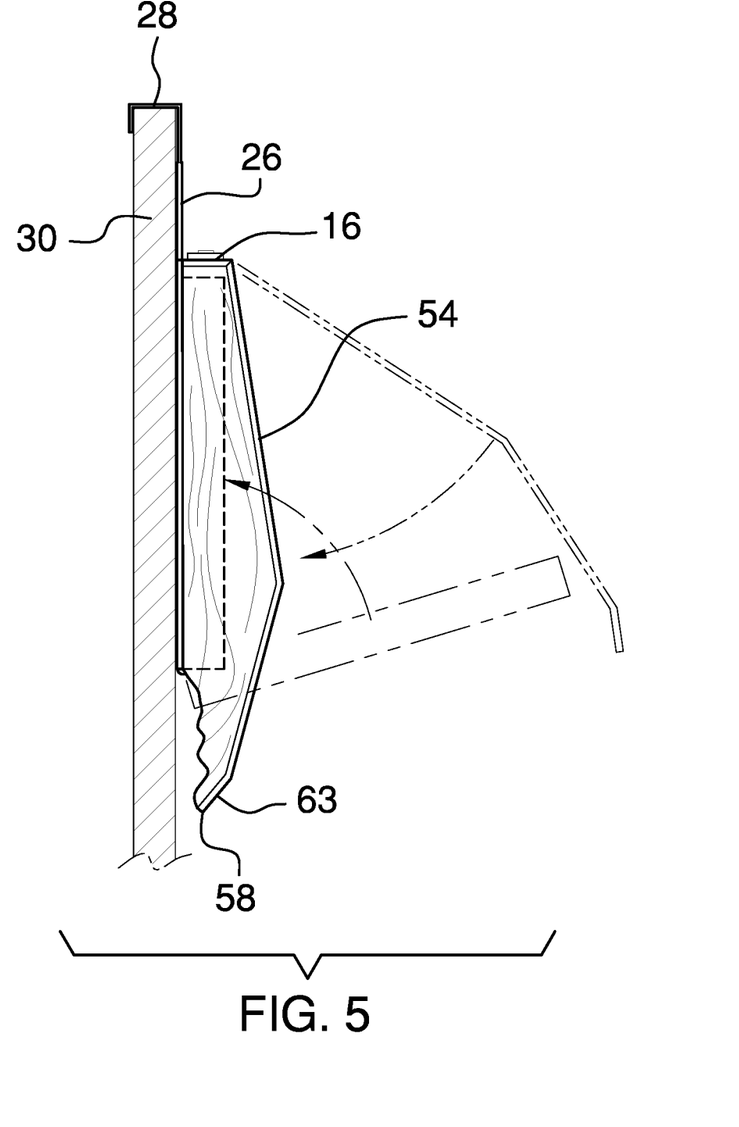
FIG. 5 is a side elevation view of an embodiment of the disclosure.
Figure 6:
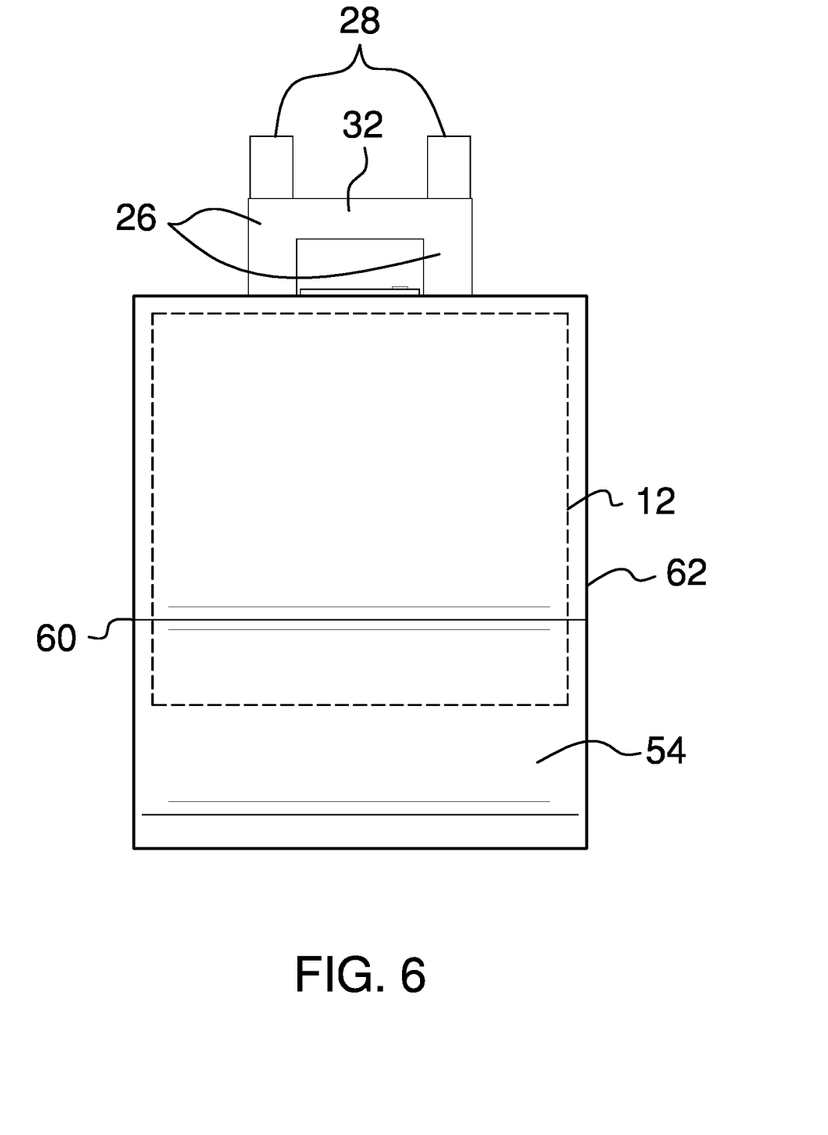
FIG. 6 is a front elevation view of an embodiment of the disclosure.
Figure 8:
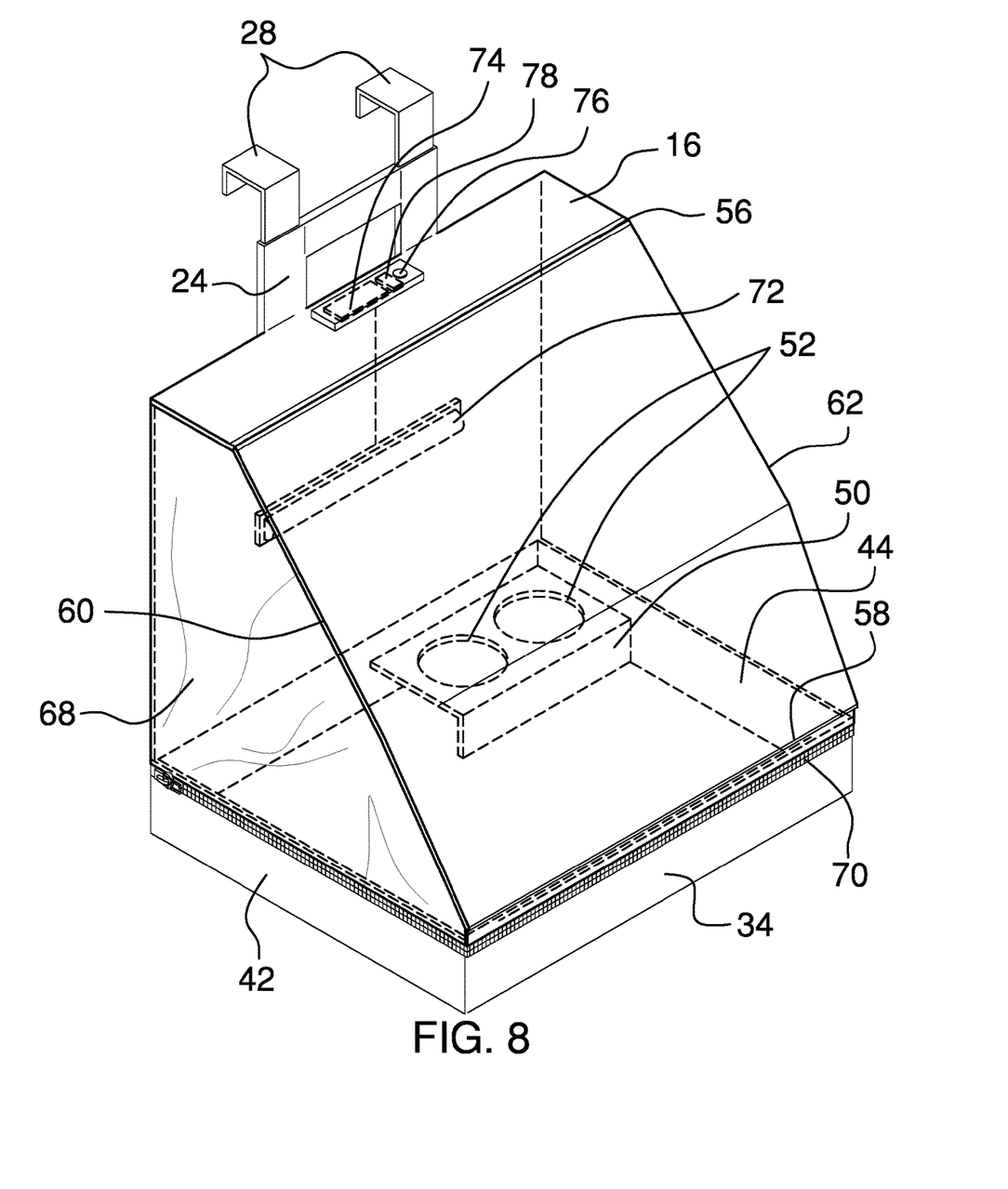
FIG. 8 is an isometric view of an embodiment of the disclosure.

A base 34 is coupled to the panel 12. The base 34 has a base top face 36, a base back edge 38, a base front edge 40, a base left edge 42, and a base right edge 44. The base back edge 38, the base front edge 40, the base left edge 42, and the base right edge 44 may extending perpendicularly upwards from the base top face 36 to define a receiving cavity 46 configured to receive a delivered food item 48. The base back edge 38 is coupled to the panel bottom edge 18 and hingingly moves between an open position oriented perpendicularly to the panel 12 (shown in FIGS. 1-4 and 8) and a closed position oriented parallel to the panel 12 (shown in FIGS. 5 and 6). The base front edge 40 may rest on the panel top edge 16 when the base 34 is in the closed position as shown in FIG. 5. A drink holder 50 may be coupled to the base 34. The drink holder may be coupled to the base back edge 38, the base right edge 44, and the base top face 36 as shown in FIG. 8. The drink holder 50 has a pair of receiving apertures 52 configured to secure beverages.

Figure 1:
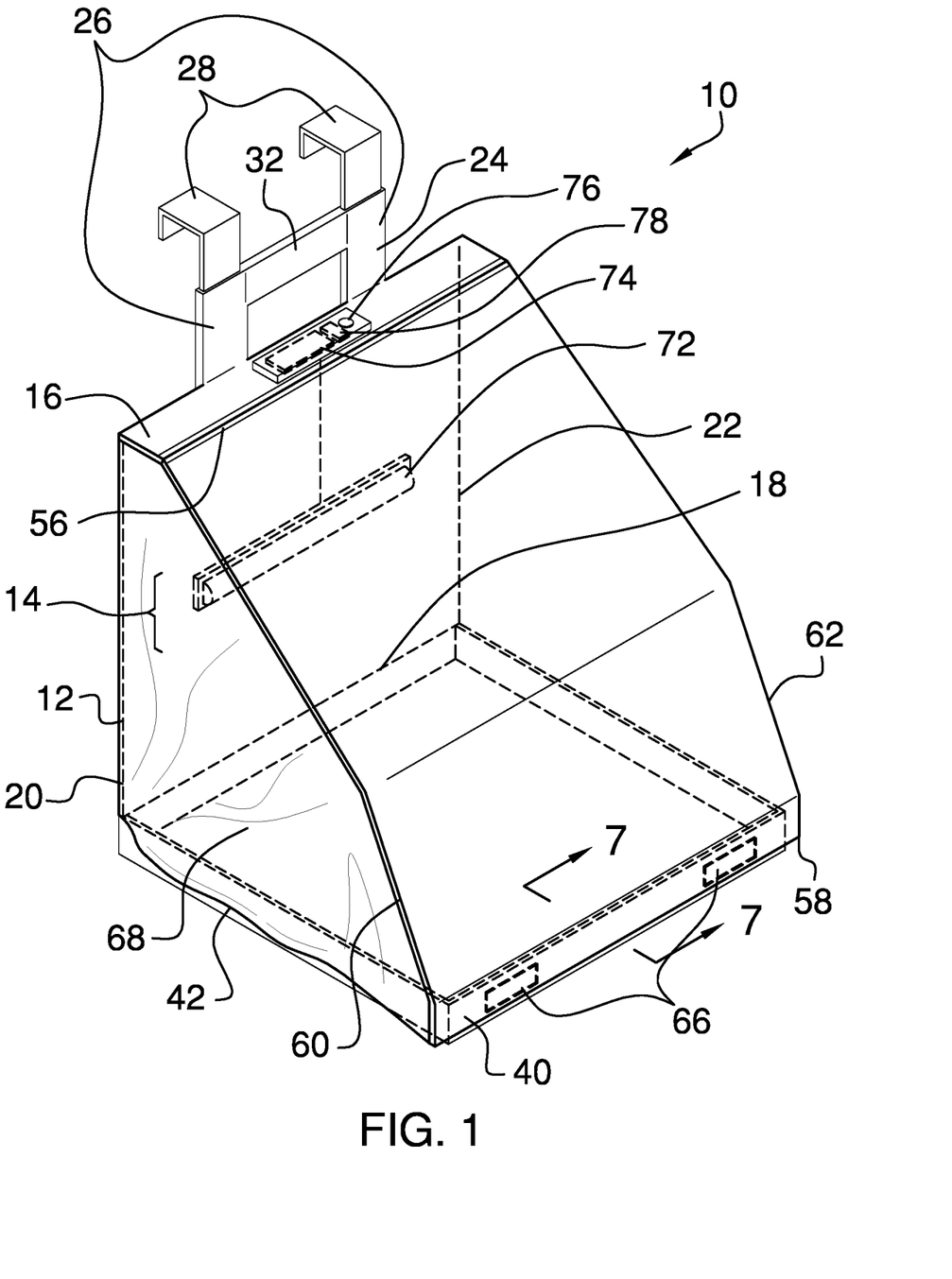
FIG. 1 is an isometric view of a sanitizing food delivery receiver apparatus according to an embodiment of the disclosure.
Figure 2:
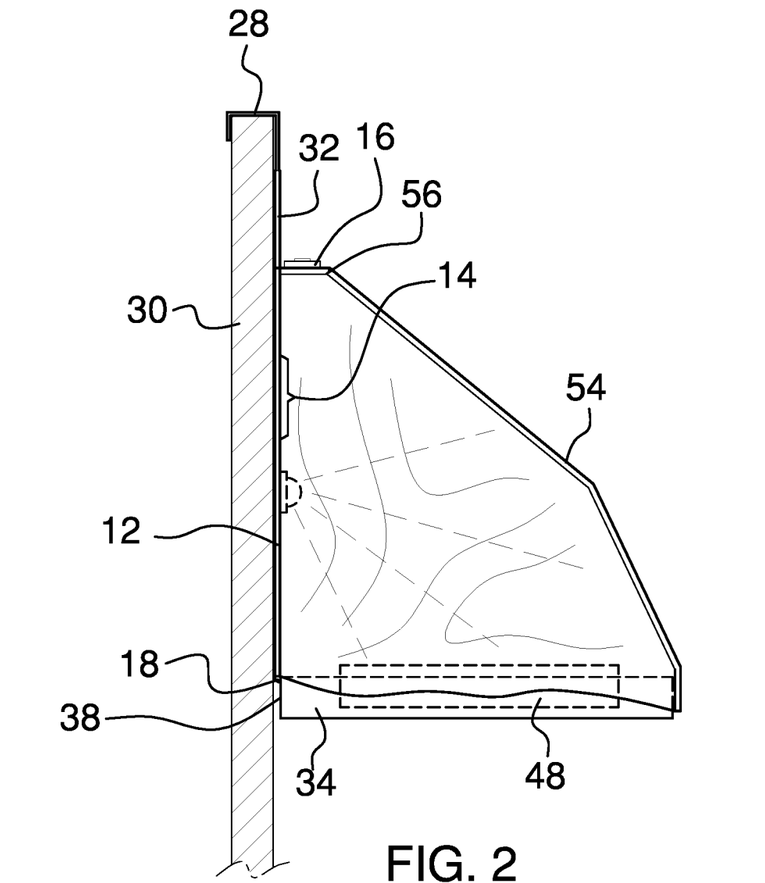
FIG. 2 is a side elevation view of an embodiment of the disclosure.
Figure 3:
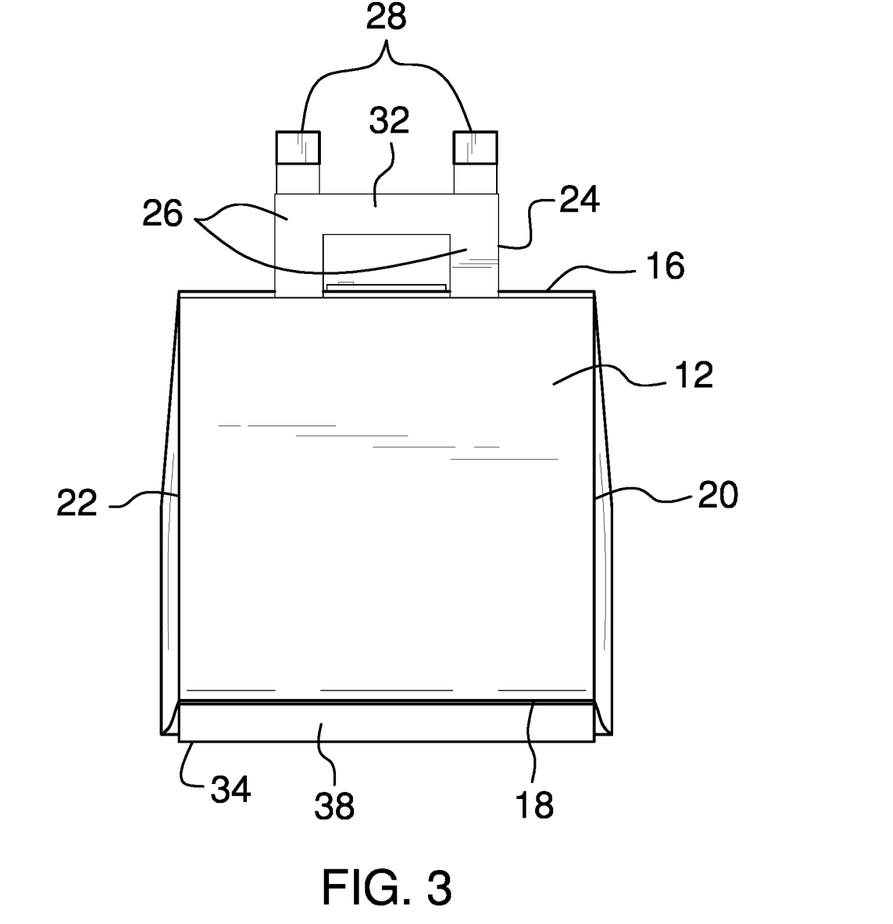
FIG. 3 is a rear elevation view of an embodiment of the disclosure.
Figure 4:
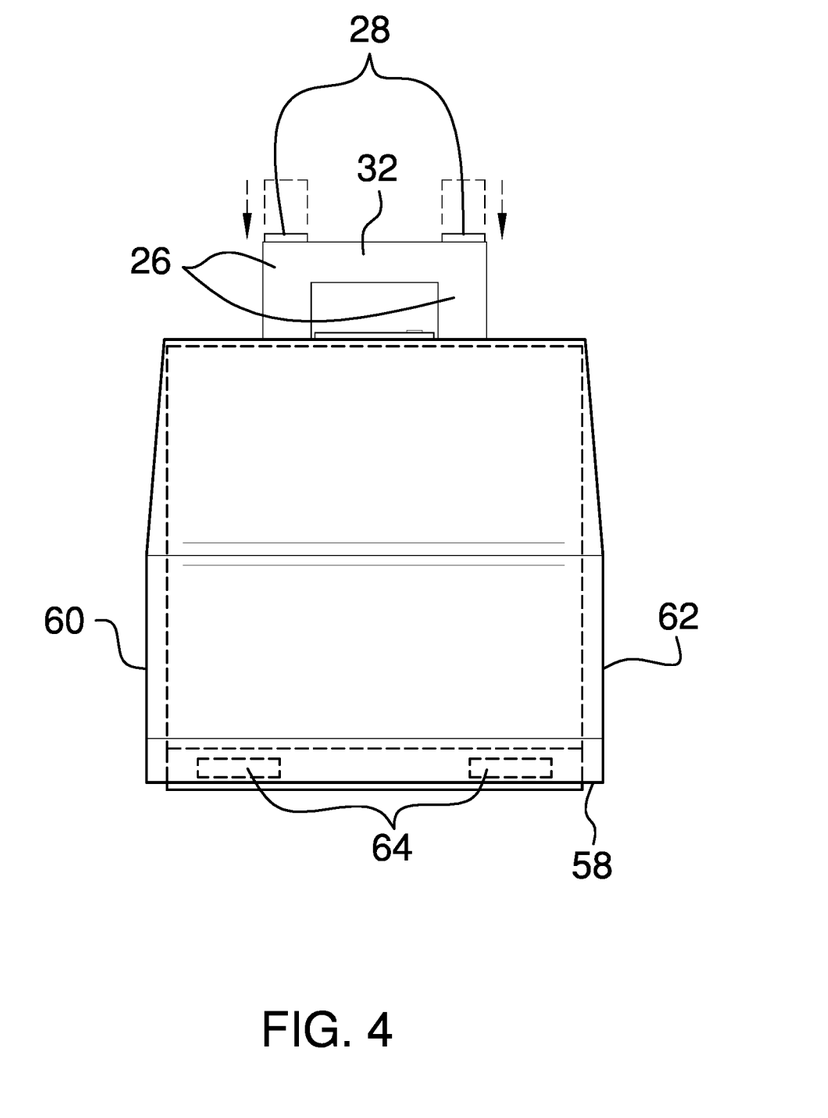
FIG. 4 is a front elevation view of an embodiment of the disclosure.
Figure 7:
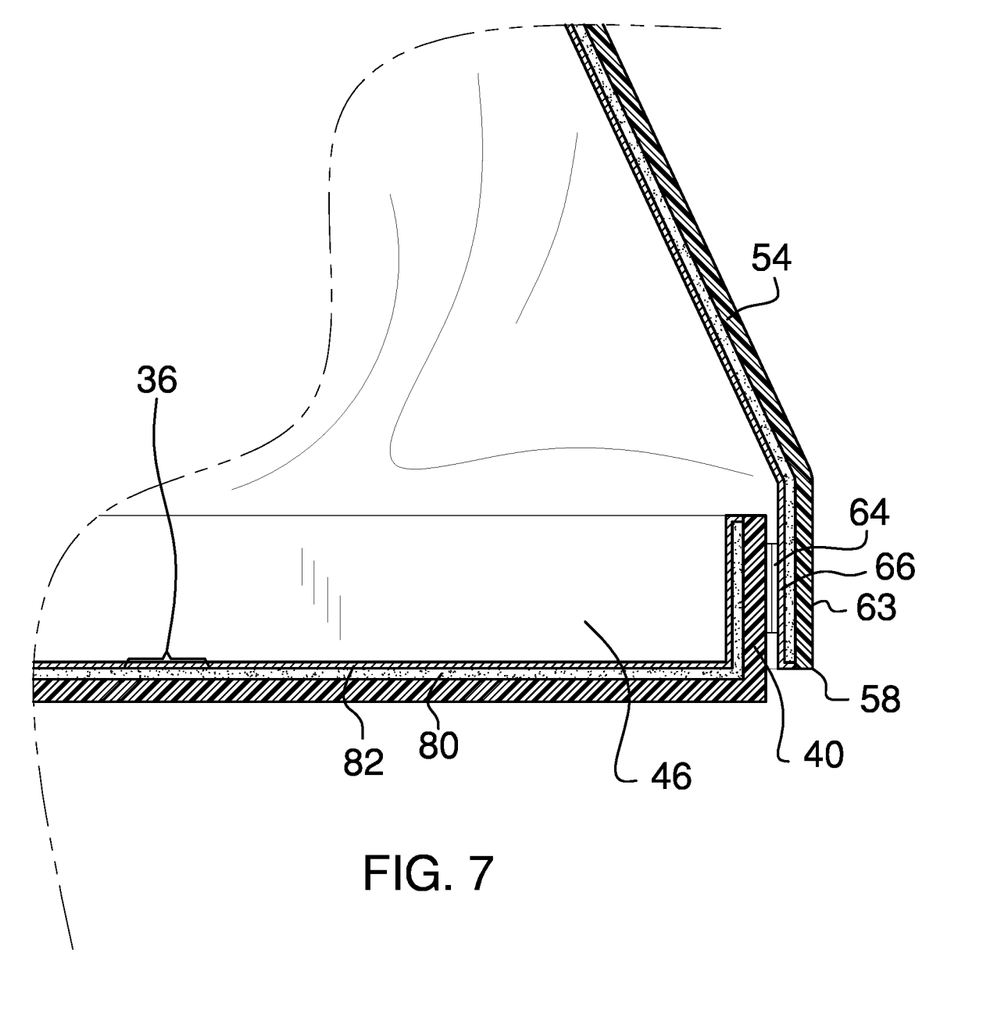
FIG. 7 is a cross-sectional view of an embodiment of the disclosure along the line 7-7 of FIG. 1.

A front cover 54 is coupled to the panel 12. The front cover 54 has a cover back edge 56, a cover front edge 58, a cover left edge 60, and a cover right edge 62. The front cover 54 may be faceted. A front facet 63 adjacent the cover front edge 58 may overlap the base front edge 40 as seen in FIGS. 1, 2, and 7. The cover back edge 56 is coupled to the panel top edge 16 and hingingly moves between an engaged position (shown in FIGS. 1-4 and 8) with the cover front edge 58 selectively engaging the base front edge 40 with the base 34 in the open position and a hang position (shown in FIGS. 5 and 6) hanging over the base 34 in the closed position.

A first engagement member 64 is coupled to the front cover 54 and a second engagement member 66 is coupled to the base 34. The first engagement member 64 is selectively engageable with the second engagement member 66. The first engagement member 64 may be coupled proximal the cover front edge 58 and the second engagement member 66 may be coupled proximal the base front edge 40. The first engagement member 64 and the second engagement member 66 may be selectively engageable fasteners such as, but not limited to, hook-and-loop, snaps, and the like.

A pair of side covers 68 is coupled to the front cover 54 and the panel 12. The pair of side covers 68 extends between the cover left edge 60 and the panel left edge 20 and between the cover right edge 62 and the panel right edge 22. The pair of side covers 68 is flexible to allow movement of the front cover 54 between the open position and the hang position. As shown in FIG. 8, the first engagement member 64 may alternatively be coupled to the pair of side covers 68 and the cover front edge 58 with the second engagement member 66 coupled to the base left edge 42, the base front edge 40, and the base right edge 44. The first engagement member 64 and the second engagement member 66 may be a zipper 70.

An ultraviolet (UV) light 72 is coupled to the panel 12. The UV light 72 may be coupled to the panel inner face 14. A battery 74 is coupled to the panel 12 and is in operational communication with the UV light 72. A power button 76 is coupled to the panel 12 and is in operational communication with the UV light 72 and the battery 74.

The battery 74 and the power button 76 may be coupled to the panel top edge 16. The power button 76 may be positioned such that it is depressed by the base front edge 40 in the closed position and activated by being released when the base 34 is moved to the open position. A transceiver 78 may be coupled to the panel 12. The transceiver 78 is in operational communication with the battery 74 and the UV light 72 and configured to be in wireless communication with a smartphone.

A quilted insulation layer 80 and a reflective layer 82 may be coupled to the base 34 and the front cover 54 to keep the delivered food item 48 warm and to distribute the UV light 72.

In use, the base 34 is moved to the open position and the UV light 72 is activated. The delivery person then places the delivered food item 48 on the base 34 and then engages the first engagement member 64 with the second engagement member 66. The UV light 72 thus sanitizes the delivered food item 48 before it is retrieved by the user and prevents the user from having to make direct contact with the delivery person.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A sanitizing food delivery receiver apparatus comprising:
   a panel having a panel inner face, a panel top edge, a panel bottom edge, a panel left edge, and a panel right edge;
   a door hook coupled to the panel, the door hook extending above the panel top edge and being configured to selectively engage a door;
   a base coupled to the panel, the base having a base top face, a base back edge, a base front edge, a base left edge, and a base right edge, the base back edge being coupled to the panel bottom edge and hingingly moving between an open position oriented perpendicularly to the panel and a closed position oriented parallel to the panel;
   a front cover coupled to the panel, the front cover having a cover back edge, a cover front edge, a cover left edge, and a cover right edge, the cover back edge being coupled to the panel top edge and hingingly moving between an engaged position with the cover front edge selectively engaging the base front edge with the base in the open position and a hang position hanging over the base in the closed position; and
   a pair of side covers coupled to the front cover and the panel, the pair of side covers extending between the cover left edge and the panel left edge and between the cover right edge and the panel right edge, the pair of side covers being flexible to allow movement of the front cover between the open position and the hang position.

2. The sanitizing food delivery receiver apparatus of claim 1 further comprising an ultraviolet (UV) light coupled to the panel; a battery coupled to the panel, the battery being in operational communication with the UV light; and a power button coupled to the panel, the power button being in operational communication with the UV light and the battery.

3. The sanitizing food delivery receiver apparatus of claim 2 further comprising a transceiver coupled to the panel, the transceiver being in operational communication with the battery and the UV light and configured to be in wireless communication with a smartphone.

4. The sanitizing food delivery receiver apparatus of claim 1 further comprising a first engagement member coupled to the front cover and a second engagement member coupled to the base, the first engagement member being selectively engageable with the second engagement member.

5. The sanitizing food delivery receiver apparatus of claim 4 further comprising the first engagement member being coupled proximal the cover front edge and the second engagement member being coupled proximal the base front edge.

6. The sanitizing food delivery receiver apparatus of claim 1 further comprising:
   the panel top edge extending perpendicularly from the panel inner face; and
   the base back edge, the base front edge, the base left edge, and the base right edge extending perpendicularly upwards from the base top face.

7. The sanitizing food delivery receiver apparatus of claim 6 further comprising the base front edge resting on the panel top edge when the base is in the closed position.

8. The sanitizing food delivery receiver apparatus of claim 1 further comprising the front cover being faceted.

9. The sanitizing food delivery receiver apparatus of claim 1 further comprising the door hook including a pair of hook sleeves and a pair of hooked arms retractably coupled within the pair of hook sleeves.

10. The sanitizing food delivery receiver apparatus of claim 9 further comprising a sleeve support extending between the pair of hook sleeves.

11. The sanitizing food delivery receiver apparatus of claim 1 further comprising a drink holder coupled to the base, the drink holder having a pair of receiving apertures configured to secure beverages.

12. A sanitizing food delivery receiver apparatus comprising:
   a panel having a panel inner face, a panel top edge, a panel bottom edge, a panel left edge, and a panel right edge, the panel top edge extending perpendicularly from the panel inner face;
   a door hook coupled to the panel, the door hook extending above the panel top edge, the door hook including a pair of hook sleeves and a pair of hooked arms retractably coupled within the pair of hook sleeves, the pair of hooked arms being configured to selectively engage a door, a sleeve support extending between the pair of hook sleeves;
   a base coupled to the panel, the base having a base top face, a base back edge, a base front edge, a base left edge, and a base right edge, the base back edge, the base front edge, the base left edge, and the base right edge extending perpendicularly upwards from the base top face, the base back edge being coupled to the panel bottom edge and hingingly moving between an open position oriented perpendicularly to the panel and a closed position oriented parallel to the panel, the base front edge resting on the panel top edge when the base is in the closed position;
   a drink holder coupled to the base, the drink holder having a pair of receiving apertures configured to secure beverages;
   a front cover coupled to the panel, the front cover having a cover back edge, a cover front edge, a cover left edge, and a cover right edge, the front cover being faceted, the cover back edge being coupled to the panel top edge and hingingly moving between an engaged position with the cover front edge selectively engaging the base front edge with the base in the open position and a hang position hanging over the base in the closed position;
   a first engagement member coupled to the front cover and a second engagement member coupled to the base, the first engagement member being selectively engageable with the second engagement member, the first engagement member being coupled proximal the cover front edge and the second engagement member being coupled proximal the base front edge;
   a pair of side covers coupled to the front cover and the panel, the pair of side covers extending between the cover left edge and the panel left edge and between the cover right edge and the panel right edge, the pair of side covers being flexible to allow movement of the front cover between the open position of the front cover and the hang position;
   an ultraviolet (UV) light coupled to the panel;
   a battery coupled to the panel, the battery being in operational communication with the UV light;
   a power button coupled to the panel, the power button being in operational communication with the UV light and the battery; and
   a transceiver coupled to the panel, the transceiver being in operational communication with the battery and the UV light and configured to be in wireless communication with a smartphone.

* * * * *